Nov. 24, 1970                D. W. BARNES                3,541,701
              TEACHING APPARATUS WITH RECEPTACLE FOR
                    QUESTION AND ANSWER SHEETS
Filed Aug. 8, 1968                                   2 Sheets-Sheet 1

INVENTOR
DONALD W. BARNES

*Shapiro and Shapiro*
ATTORNEYS

Nov. 24, 1970  D. W. BARNES  3,541,701
TEACHING APPARATUS WITH RECEPTACLE FOR
QUESTION AND ANSWER SHEETS
Filed Aug. 8, 1968  2 Sheets-Sheet 2

INVENTOR
DONALD W. BARNES

Shapiro and Shapiro
ATTORNEYS

United States Patent Office 3,541,701
Patented Nov. 24, 1970

3,541,701
TEACHING APPARATUS WITH RECEPTACLE FOR QUESTION AND ANSWER SHEETS
Donald W. Barnes, Fort Lauderdale, Fla., assignor to Serge A. Birn Company, Inc., Louisville, Ky., a corporation of Delaware
Filed Aug. 8, 1968, Ser. No. 751,221
Int. Cl. G09b 1/00; A47d 1/12
U.S. Cl. 35—8                                                10 Claims

ABSTRACT OF THE DISCLOSURE

Teaching apparatus in which a receptacle for question and answer sheets has upper and lower compartments separated by a divider wall inclined rearwardly upward between a pair of side walls. A partial top wall of the receptacle constitutes a writing surface provided with a paper holder for work sheets. Both compartments are open at the rear, and the lower compartment also has an inlet opening through the divider wall. The question and answer sheets have successive frames each displaying a question and the answer to the question of the preceding frame, so that the question and answer sheets may be withdrawn from the upper compartment, frame by frame, for viewing and then inserted into the lower compartment for storage.

BACKGROUND OF THE INVENTION

This invention relates to teaching apparatus and more particularly to apparatus for facilitating the viewing of consecutive question and answer frames, for supporting and storing question and answer sheets, and for supporting work sheets.

Teaching apparatus available heretofore for viewing consecutive question and answer frames is generally elaborate, complex and expensive. A need has existed for simplified apparatus to facilitate the handling of consecutive question and answer frames to permit a student to read a question, write the answer on a work sheet, and then to view the correct answer and proceed to the next question.

BRIEF DESCRIPTION OF THE INVENTION

It is accordingly a principal object of the present invention to provide improved teaching apparatus which fulfills the foregoing need.

Briefly stated, the present invention is concerned with teaching apparatus comprising a receptacle divided into upper and lower compartments for containing question and answer sheets. The upper compartment terminates short of the rear of the receptacle so that the question and answer sheets contained therein and supported upon a divider wall separating the compartments may be viewed frame by frame as the sheets are withdrawn from the upper compartment. The sheets may then be inserted through an inlet opening to the lower compartment for storage and later re-use. The top wall of the upper compartment constitutes a writing surface and has a paper holder thereon for retaining work sheets upon which a student may write the answers to the questions presented on the question and answer sheets.

BRIEF DESCRIPTION OF THE DRAWINGS

The foregoing and other objects, advantages, and features of the invention and the manner in which the same are accomplished will become more readily apparent upon consideration of the following detailed description of the invention taken in conjunction with the accompanying drawings, which illustrate a preferred and exemplary embodiment, and wherein.

DETAILED DESCRIPTION OF THE INVENTION

Figure 3:
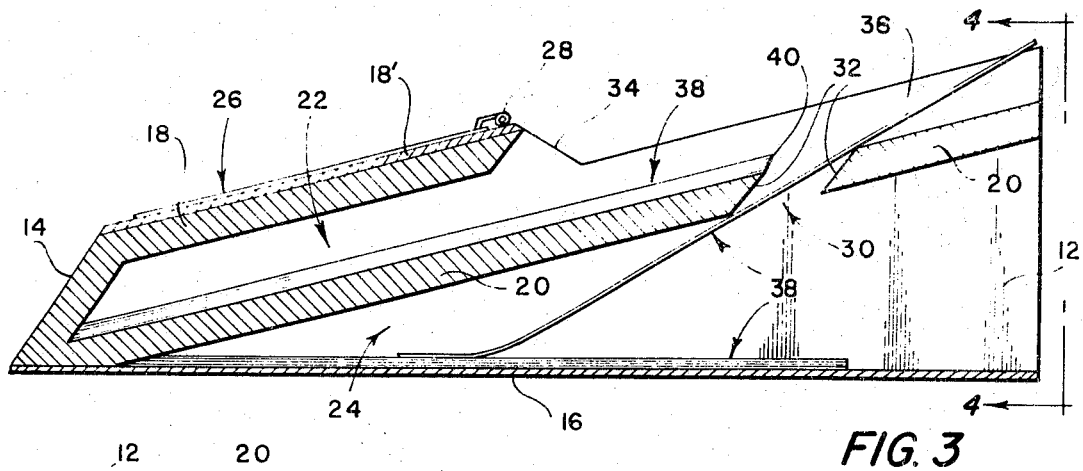
FIG. 3 is a longitudinal sectional view taken along line 3—3 of FIG. 2.
Figure 4:
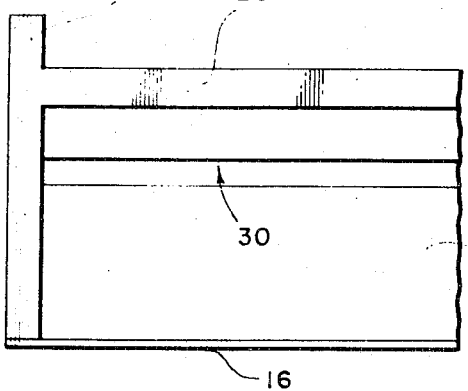
FIG. 4 is a fragmentary rear elevation view as seen in the direction of the arrows 4—4 of FIG. 3.

Referring to the drawings, the teaching apparatus of the invention comprises a receptacle 10 having a pair of parallel, elongated, vertical side walls 12, a front wall 14, a bottom wall 16, a top wall 18, and a divider wall 20 which separates upper and lower compartments 22 and 24, respectively (see FIG. 3). The rear of the receptacle is left open. The top wall 18 and the divider wall 20 are inclined rearwardly upward at about 15 degrees elevation angle and are preferably substantially parallel. The top wall 18 extends rearwardly from the front wall 14 slightly less than one-half the length of the receptacle 10, while the divider wall 20 extends substantially the full length of the receptacle. The top wall constitutes a smooth writing surface for receiving ruled paper work sheets 26 which are retained on the sloping surface by a clip-type paper holder 28 of the conventional spring-biased type. Divider wall 20, which extends laterally from side wall to side wall, is provided with a slot 30 constituting an inlet opening to the lower compartment 24. The laterally extending edges 32 defining the opening 30 are bevelled so as to be inclined rearwardly upward, and the front wall 14 may have an inclination about 60 degrees, approximately the same as the edges 32.

The side walls 12 are stepped downwardly from the top wall 18 at 34 but nevertheless have portions 36 which extend above the divider wall 20 so as to provide guidance for paper question and answer sheets 38 supported by the divider wall 20. When at rest within the upper compartment 22, the question and answer sheets 38 project from the open rear of compartment 22, the top edges 40 of the sheets being located approximately at the lower edge 32 of slot 30. This permits the question and answer sheets to be readily grasped at their top edge so that they may be easily withdrawn from compartment 22 and slipped rearwardly along divider wall 20.

Figure 1:
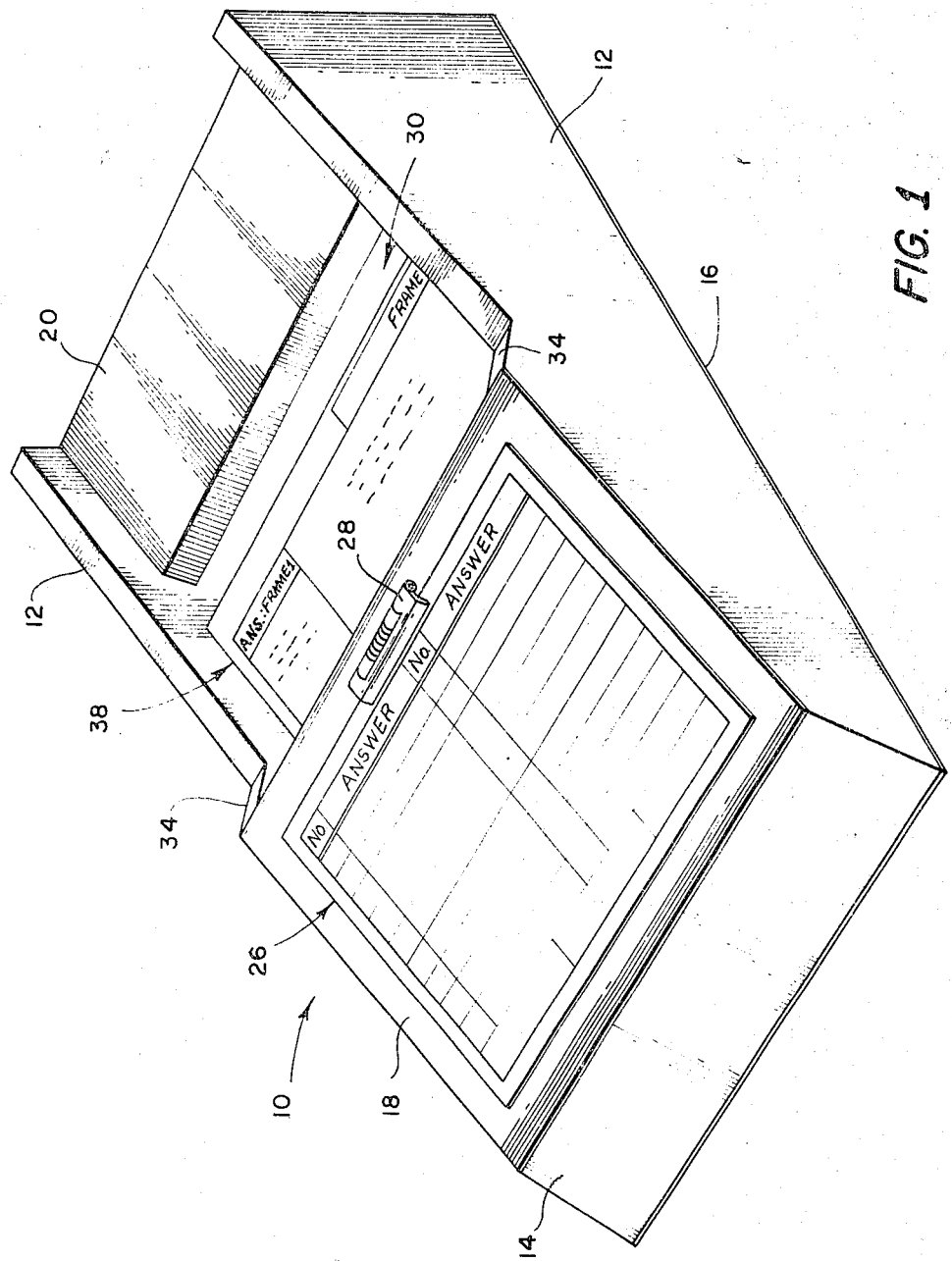
FIG. 1 is a perspective view of the apparatus of the invention illustrating question and answer sheets projecting from the upper compartment and work sheets held upon the writing surface.
Figure 2:
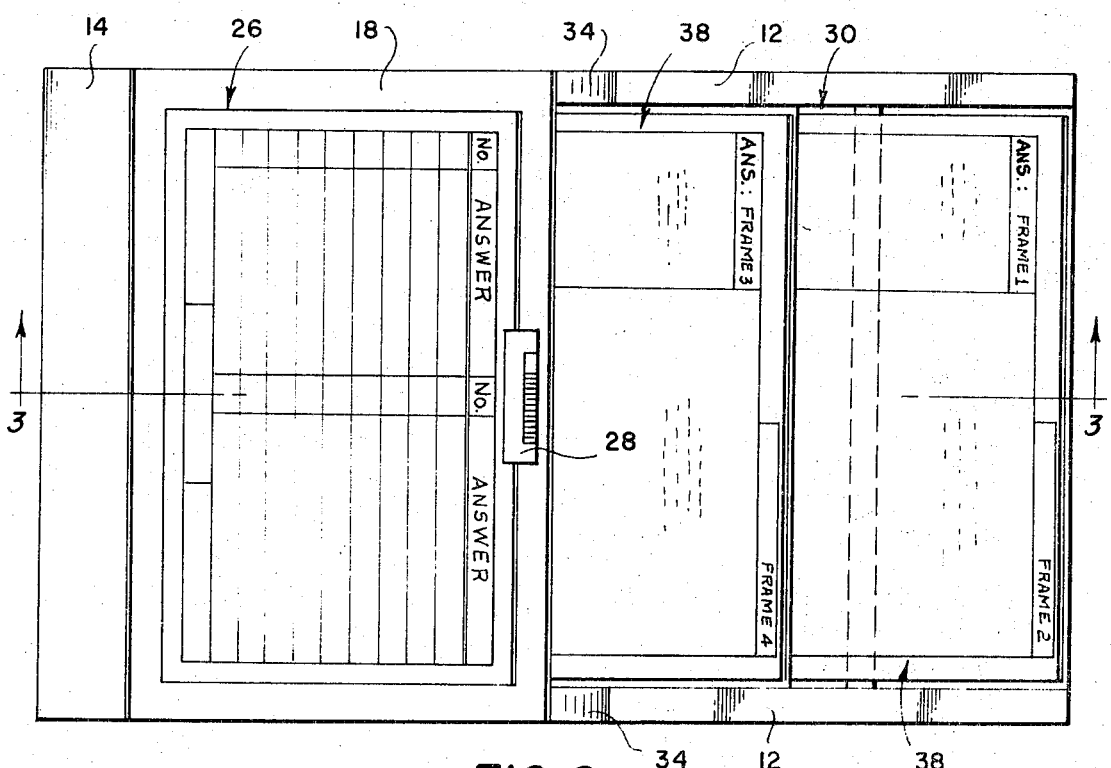
FIG. 2 is a plan view of the apparatus illustrating a question and answer sheet being inserted into the lower compartment.

The question and answer sheets are divided horizontally into a plurality of frames as indicated in FIG. 2, each frame displaying a question and the answer to the question of the preceding frame. Usually, each sheet will have two or three such frames arranged consecutively from the top downwardly, the frames being identified by numbers or other suitable indicia and continuing consecutively from the bottom of one sheet to the top of the underlying sheet, etc. Thus the top sheet may have initial instructions followed by frame 1, the next sheet frames 2 and 3 associated with the answers to frames 1 and 2, respectively, the next sheet frames 4 and 5 associated with the answers to frames 3 and 4, respectively, etc.

To use the apparatus of the invention the receptacle is placed on a desk or table and the student is seated facing the front of the apparatus. A set of question and answer sheets 38 is placed within the upper compartment 22, slipping to the front of the receptacle by virtue of the slope of the divider wall 20. The student grasps the top sheet at its upper edge 40 and slides the sheet rearwardly from the upper compartment just enough to expose the first question, assuming that the question is not already sufficiently exposed. The student writes his answer to that question upon a work sheet 26 supported upon the writing surface and then withdraws the top question and answer sheet sufficiently to expose the next frame, which gives the correct answer to the question of the first frame and poses a second question to be answered in the same manner. After all questions upon the top sheet have been answered, the sheet is withdrawn sufficiently to permit the lower edge to be inserted within the inlet opening 30 to the lower compartment 24 when the sheet inclination is increased somewhat as shown in FIG. 3, the inclination of the edges 32 facilitating admission of the sheet. The sheet is then rapidly pushed forwardly and drops into the lower compartment. Each question and answer sheet is processed in the same manner until all of the sheets of the set have entered the lower compartment. The sheets may then be withdrawn from the lower compartment through the opening at the rear. Since the question and answer sheets are now in reverse order it is advantageous to print both sides of each sheet with the same questions and answers, so that the entire set need only be turned over to render the set ready for re-use.

The side walls, front wall, top wall, and divider wall of the receptacle 10 may be ½ inch pressed wood panels, for example, while the bottom wall 16 may be a ⅛ inch sheet of "Masonite." The top wall 18 may have a ¹⁄₁₆ inch facing sheet of wood-grained "Formica" 18' to provide a smoother writing surface. The receptacle may be about 16¼ inches long by 10 inches wide and 5 inches high, top wall 18 terminating 7½ inches back from the front extremity of the bottom wall measured horizontally. Sheets 26 may be 8½ inches by 5½ inches and sheets 38 may be 8½ inches by 11 inches.

The apparatus of the invention, while quite simple and economical to manufacture, is nevertheless highly efficient in permitting reading and answering of consecutive questions, storing question and answer sheets both before and after use, and supporting work sheets on which answers may be written. While a preferred embodiment of the invention has been shown and described, it will be apparent to those skilled in the art that changes can be made in this embodiment without departing from the principles and spirit of the invention, the scope of which is defined in the appended claims.

The invention claimed is:

1. Teaching apparatus comprising a receptacle for question and answer sheets, said receptacle having a pair of spaced side walls and having a pair of compartments between said side walls one above the other and separated by a divider wall, the upper compartment having a top wall extending rearwardly from the front of said receptacle along only a portion of said side walls and constituting a writing surface for supporting work sheets, said upper compartment having a rear opening through which question and answer sheets supported upon said divider wall may project rearwardly for viewing, said divider wall having a portion thereof extending rearwardly substantially beyond said top wall and being unobstructed from above for supporting question and answer sheets thereon freely accessible so that the user of said apparatus may manually grasp said question and answer sheets to withdraw them from said upper compartment, said lower compartment having an inlet opening adjacent to the rear thereof through which question and answer sheets withdrawn from said upper compartment may be inserted for storage.

2. The apparatus of claim 1, said top wall having means for releasably retaining work sheets thereon.

3. The apparatus of claim 2, said retaining means comprising a spring-biased clip adjacent to the rear extremity of said top wall.

4. The apparatus of claim 1, the portions of said side walls extending rearwardly beyond said top wall also extending upwardly above said divider wall for guiding question and answer sheets therebetween.

5. The apparatus of claim 1, said inlet opening to said lower compartment comprising a slot in said divider wall extending laterally between said side walls and located intermediate the rear extremity of said top wall and the rear extremity of said divider wall.

6. The apparatus of claim 5, said divider wall being inclined rearwardly upward and said inlet opening having the front and rear edges thereof inclined rearwardly upward.

7. The apparatus of claim 1, said top wall and said divider wall being inclined rearwardly upward.

8. The apparatus of claim 1, said receptacle also having a bottom wall which extends from the front to the rear of the receptacle and connects said side walls and having a front wall which extends upwardly from said bottom wall to said top wall, said bottom wall being the lower extremity of said lower compartment and supporting question and answer sheets thereon in said lower compartment, said lower compartment being open at the rear of said receptacle beyond said bottom wall for providing access to the question and answer sheets in said lower compartment.

9. The apparatus of claim 1, having in combination with said receptacle a plurality of question and answer sheets divided horizontally into a plurality of frames each having a question displayed thereon and an answer to the question of the previous frame, each question and answer sheet projecting rearwardly from the upper compartment beyond said top wall when such sheets are fully inserted within said upper compartment, whereby said question and answer sheets may be withdrawn from said upper compartment frame by frame for viewing questions and answers consecutively and then for inserting the sheets into the said lower compartment.

10. The apparatus of claim 9, the top edge of said question and answer sheets being located adjacent to the inlet opening to said lower compartment when such sheets are fully inserted within said upper compartment whereby said question and answer sheets may be readily grasped adjacent to their top edges.

References Cited

UNITED STATES PATENTS 1,609,418   12/1926   Nechamkin et al. _____ 281—45 X
3,105,307   10/1963   Cornell _____ 35—9

WILLIAM H. GRIEB, Primary Examiner

U.S. Cl. X.R.
281—45; 312—60